(12) United States Patent
Kates

(10) Patent No.: US 7,286,056 B2
(45) Date of Patent: Oct. 23, 2007

(54) SYSTEM AND METHOD FOR PEST DETECTION

(76) Inventor: Lawrence Kates, 1111 Bayside Dr., Corona Del Mar, CA (US) 92625

(*) Notice: Subject to any disclaimer, the term of this patent is extended or adjusted under 35 U.S.C. 154(b) by 275 days.

(21) Appl. No.: 11/086,023

(22) Filed: Mar. 22, 2005

(65) Prior Publication Data

US 2006/0215885 A1    Sep. 28, 2006

(51) Int. Cl.
*G08B 23/00* (2006.01)

(52) U.S. Cl. .............. 340/573.1; 340/384.2; 340/541; 340/561; 340/573.3; 250/221

(58) Field of Classification Search ............ 340/573.1, 340/573.2, 573.3, 578, 581, 582, 583, 384.2, 340/384.72, 551–561, 541, 505; 250/221
See application file for complete search history.

(56) References Cited

U.S. PATENT DOCUMENTS

| | | | |
|---|---|---|---|
| 4,862,145 A * | 8/1989 | Meehan et al. | 340/573.2 |
| 4,884,064 A * | 11/1989 | Meehan | 340/573.2 |
| 5,343,652 A * | 9/1994 | Johnson | 43/132.1 |
| 5,513,465 A * | 5/1996 | Demarest et al. | 43/113 |
| 5,575,105 A * | 11/1996 | Otomo | 43/132.1 |
| 5,646,404 A | 7/1997 | Litzkow et al. | |
| 6,445,301 B1 * | 9/2002 | Farrell et al. | 340/573.2 |
| 6,653,971 B1 * | 11/2003 | Guice et al. | 342/54 |
| 6,724,312 B1 * | 4/2004 | Barber et al. | 340/573.2 |
| 6,853,328 B1 | 2/2005 | Guice et al. | |
| 6,937,156 B2 * | 8/2005 | Gardner et al. | 340/573.2 |
| 7,071,829 B2 * | 7/2006 | Gardner et al. | 340/573.2 |
| 7,239,720 B2 * | 7/2007 | Shima | 382/107 |
| 2004/0200129 A1 | 10/2004 | Studer et al. | |
| 2005/0145786 A1 * | 7/2005 | Rice et al. | 250/252.1 |
| 2006/0028345 A1 * | 2/2006 | Lee | 340/573.2 |

FOREIGN PATENT DOCUMENTS

| | | |
|---|---|---|
| JP | 09 094048 A | 4/1997 |
| JP | 2000 253799 A | 1/2001 |
| WO | WO 03-084319 A1 | 10/2003 |

* cited by examiner

*Primary Examiner*—Benjamin C. Lee
*Assistant Examiner*—Daniel Previl
(74) *Attorney, Agent, or Firm*—Knobbe, Martens, Olson & Bear, LLP

(57) ABSTRACT

Systems and methods for detecting presence and movement of pests. Various embodiments of a pest detection system can be based on, for example, a beam-interrupt detector or a thermal imaging device. The beam-interrupt detection based system can provide functionalities such as counting of pests crossing a given beam. A plurality of such beams at different heights can also allow distinguishing different sized pests. The thermal imaging based detection system can provide functionalities such as tracking movement of pests. A recording can be triggered by detection of pest movement, thereby improving the efficiency of recording and reviewing information indicative of presence and movement of pests in a monitored area. Movement of pests can be monitored on a passive basis, or by providing a stimulus that induces movement.

23 Claims, 13 Drawing Sheets

SYSTEM AND METHOD FOR PEST DETECTION

BACKGROUND

1. Field

The present teachings generally relate to the pest control and more particularly, to systems and methods for detecting and monitoring pests.

2. Description of the Related Art

Various creatures such as bugs and rodents are considered as pests to most human beings. Aside from their general undesirability, pests can create health hazards in many situations. For example, pests can transmit various diseases when they come in contact with food items in areas such as a kitchen.

Presence of pests, extent of their infestation, and their hiding locations can be difficult to ascertain. Most pests move about the example kitchen when human beings are not present—for example, in the dark. When a human being enters the kitchen and turns on the light, pests quickly scurry away to their hiding locations. Thus, it is rather difficult to ascertain where they congregate in darkness and where they scurry to. Knowledge of such information can facilitate a more efficient pest control. Thus, there is a need for an improved pest detection system.

SUMMARY

The foregoing needs are addressed by systems and methods for detecting the presence and movement of pests. Various embodiments of a pest detection system can be based on, for example, a beam-interrupt detector, beam backscatter detector, and/or a thermal imaging device. The beam-interrupt detection based system can provide functionalities such as counting of pests crossing a given beam. A plurality of such beams at different heights can also allow distinguishing different sized pests. The thermal imaging based detection system can provide functionalities such as tracking the movement of pests. A recording can be triggered by detection of pest movement, thereby improving the efficiency of recording and reviewing information indicative of presence and movement of pests in a monitored area. Movement of pests can be monitored on a passive basis, or by providing a stimulus that induces movement.

In one embodiment, the pests detection system includes a transmitter configured to produce an energy beam, a first receiver configured to detect energy from the beam, and a processor provided to the first receiver. The processor is configured to detect a presence of pests by determining when the energy beam is at least partially interrupted. In one embodiment, the processor is also configured to estimate an extent of pest infestation by counting a number of times the beam is at least partially interrupted during a desired time period.

In one embodiment, the first receiver is aligned with the beam. In one embodiment, the first receiver is configured to receive backscattered energy from the beam when the beam illuminates a pest. In one embodiment, the first receiver is configured to receive bistatic backscattered energy from the beam when the beam illuminates a pest. In one embodiment, the first receiver is battery-powered. In one embodiment, the first transmitter is battery-powered. In one embodiment, the processor is configured to control the first transmitter. In one embodiment, the processor is configured to control the first transmitter by using wireless communication. In one embodiment, the processor is configured to receive data from the first receiver by using wireless communication.

In one embodiment, the first receiver is provided at a first height, the system further comprising a second receiver provided at a second height.

In one embodiment, the first transmitter comprises a laser. In one embodiment, the first transmitter produces the energy beam as a substantially continuous beam. In one embodiment, the first transmitter produces the energy beam as an intermittent beam. In one embodiment, the first transmitter produces the energy beam as a pulsed beam. In one embodiment, the first transmitter produces the energy beam as a substantially continuous beam.

In one embodiment, the system is configured to produce the energy beam at night. In one embodiment, the pest detection system includes a light sensor, and the system is configured to produce the energy beam during periods of relative darkness. In one embodiment, the system is configured to produce the energy beam during one or more specified time periods. In one embodiment, the pest detection system includes a motion detector configured to detect motion from humans, and wherein the system is configured to produce the energy beam during periods when motion is not detected. In one embodiment, the system is configured to turn off the energy beam when a room light turns on. In one embodiment, the system is configured to turn off the energy beam when motion is detected by a motion detector. In one embodiment, the receiver is configured to send data at regular intervals. In one embodiment, the receiver is configured to send data when a specified pest detection count is exceeded. In one embodiment, the receiver is configured to send data when at least a partial interruption of the beam is detected.

In one embodiment, the receiver is configured to send data when a backscatter from the beam changes. In one embodiment, the receiver is configured to send data when interrogated by the processor.

In one embodiment, the pest detection system includes a camera configured to produce first and second digital images, and a processor provided to the camera. The processor is configured to examine the first and second digital images to detect a movement of one or more pests by determining movement of a pest-sized object in the first and second images.

In one embodiment, the camera is configured to produce an image from infrared light corresponding to thermal sources.

In one embodiment, the pest detection system includes an illumination source configured to at least partially illuminate a field of view of the camera. In one embodiment, the illumination source comprises an infrared source. In one embodiment, the illumination source comprises an ultraviolet source.

In one embodiment, the camera comprises a zoom feature controlled by the processor. In one embodiment, the camera comprises a pan feature controlled by the processor. In one embodiment, the processor is configured to control the camera by using wireless communication.

In one embodiment, the processor is configured to count the number of pests. In one embodiment, the camera is configured to identify the one or more pests at least in part by measuring a size of the pest in the first image. In one embodiment, the camera is configured to identify the one or more pests at least in part by measuring a size and movement track of the pest in the first and second images. In one embodiment, the processor is configured to distinguish between pests and humans at least in part by measuring a size of a moving object in the first and second image.

In one embodiment, the system is configured to operate at night. In one embodiment, further comprising a light sensor, and wherein the system is configured to operate during periods of relative darkness. In one embodiment, the system is configured to operate during one or more specified time periods. In one embodiment, the pest detection system includes a motion detector configured to detect motion from humans, and wherein the system is configured to operate during periods when motion is not detected. In one embodiment, the system is configured to suspend pest detection when a room light turns on. In one embodiment, the system is configured to suspend pest detection when motion is detected by a motion detector.

In one embodiment, the camera is configured to send data at regular intervals. In one embodiment, the camera is configured to send data when a specified pest detection count is exceeded. In one embodiment, the camera is configured to send data when at least a partial interruption of the beam is detected. In one embodiment, the camera is configured to send data when a backscatter from the beam changes. In one embodiment, the camera is configured to send data when interrogated by the processor.

DETAILED DESCRIPTION OF SOME EMBODIMENTS

The present teachings relate to systems and methods for detecting and/or tracking pests such as bugs, rodents, and the like. As is known, undesirable pests are frequently difficult to detect because they usually move about when human beings are not around. For example, a kitchen is one area where pests are likely to be found at night time when it is dark and human occupants are absent. It is possible to indiscriminately record, for example, thermal images of the example kitchen during the entire dark period, and ultimately obtain information about the pests. It is apparent, however, that such a method would require resources to record for a relatively long period of time. Furthermore, someone would have to review the relatively lengthy record that can contain little, if any, useful information. The present teachings teach how the detection and/or recording of pests can be achieved in a more efficient manner.

Figure 1:
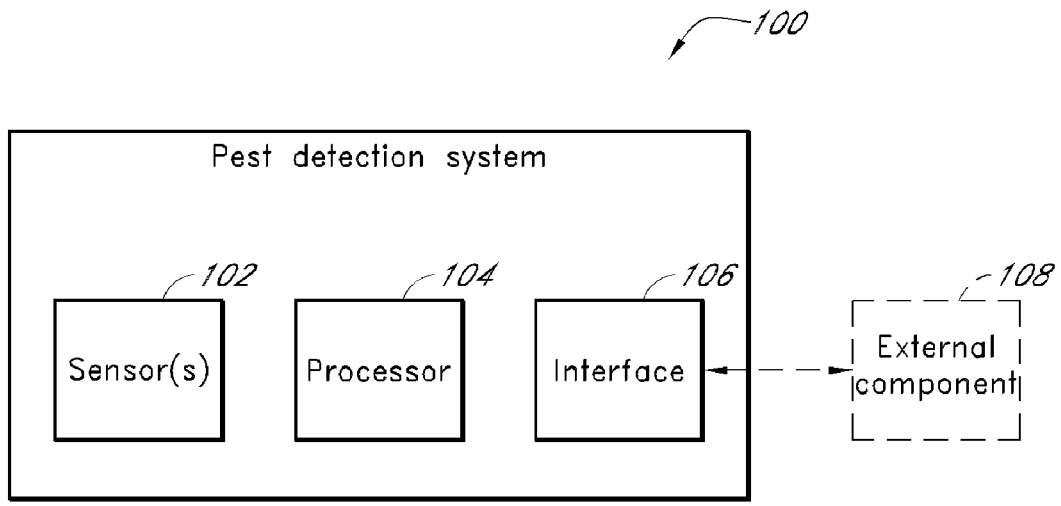
FIG. 1 shows a block diagram of one embodiment of a pest detection system having a sensor and a processor configured to allow detection of pests.

FIG. 1 shows a block diagram of one embodiment of a pest detection system 100 that includes a sensor component 102, a processor component 104, and an interface component 106. In one embodiment, the pest detection system 100 can also be linked to an external component 108 via the interface component 106. Various example functionalities of the foregoing components are described below in greater detail.

In general, it will be appreciated that the processors can include, by way of example, computers, program logic, or other substrate configurations representing data and instructions, which operate as described herein. In other embodiments, the processors can include controller circuitry, processor circuitry, processors, general purpose single-chip or multi-chip microprocessors, digital signal processors, embedded microprocessors, microcontrollers and the like.

Furthermore, it will be appreciated that in one embodiment, the program logic can be implemented as one or more components. The components can be configured to execute on one or more processors. The components include, but are not limited to, software or hardware components, modules such as software modules, object-oriented software components, class components and task components, processes methods, functions, attributes, procedures, subroutines, segments of program code, drivers, firmware, microcode, circuitry, data, databases, data structures, tables, arrays, and variables.

Figure 2:
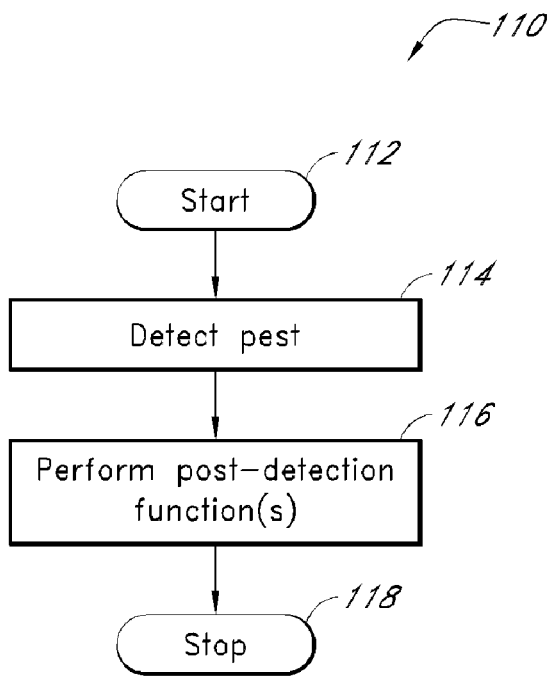
FIG. 2 shows one embodiment of a process that can be performed by the processor of the pest detection system of FIG. 1.

FIG. 2 shows one embodiment of a process 110 that can be performed by the system 100 of FIG. 1. The process 110 begins at a start state 112, and in a process block 114, the process 110 performs a pest detection function. In a process block 116, the process 110 performs one or more post-detection functions. The process 110 ends at a stop state 118. Various examples of the pest detection and post-detection functionalities of the foregoing process blocks are described below in greater detail.

Figure 3A:
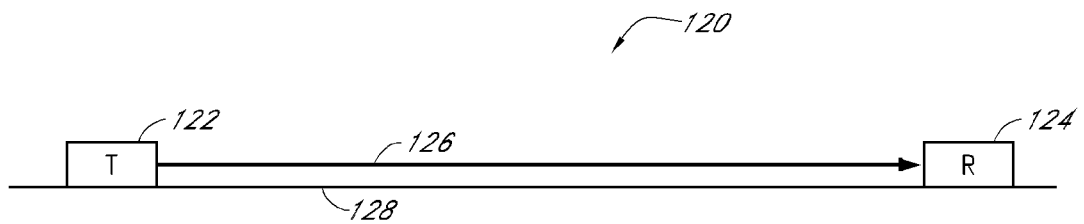
FIGS. 3A and 3B show one embodiment of an example detector assembly that can be configured to provide pest detection function of the sensor of the system of FIG. 1.
Figure 3B:
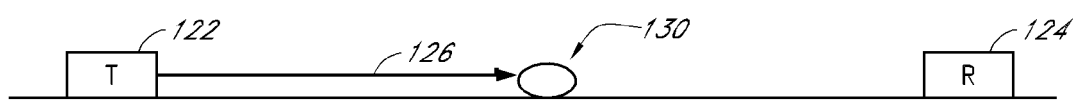

FIGS. 3A and 3B show an example operation of one embodiment of a sensor assembly 120 that can be an example of the sensor component 102 described above in reference to FIG. 1. As shown in FIG. 3A, the sensor assembly 120 includes a transmitter 122 and a receiver 124 positioned on an example surface 128. In one embodiment, the transmitter 122 transmits a "beam" 126 of electromagnetic radiation that is detectable by the receiver 124 when the beam 126 is substantially unobstructed. For the purpose of description herein, "beam" can include highly coherent and directional radiation such as a laser, to other types of more dispersive radiation that are collimated or shaped sufficiently to allow detection by the receiver 124 when substantially unobstructed.

FIG. 3B shows that a pest 130 between the transmitter 122 and the receiver 124 can break or partially obstruct the beam 126 so that the receiver 124 detects a drop in beam intensity of the beam 126 due to a full or partial interruption of the beam 126. Thus, the sensor assembly 120 can be used to detect the presence of one or more pests in a region between the transmitter 122 and the receiver 124. The separation distance between the transmitter 122 and the receiver 124 can be determined by factors such as, but not limited to, how well the beam 126 is defined, the dimension of an area to be monitored, the likely density of the pests crossing the beam 126, and the desired objective of detection. For example, if the desired objective is to monitor a large area, and the pest density is not an important concern, one can separate the transmitter and the receiver relatively far apart and use a relatively highly defined beam such as a laser. In another example, if the desired objective is to obtain a more accurate count of pests passing through a given monitored area, the separation between the transmitter and the receiver can be reduced to thereby reduce the likelihood that the beam will be broken by more than one pest at a given time.

Figure 3C:
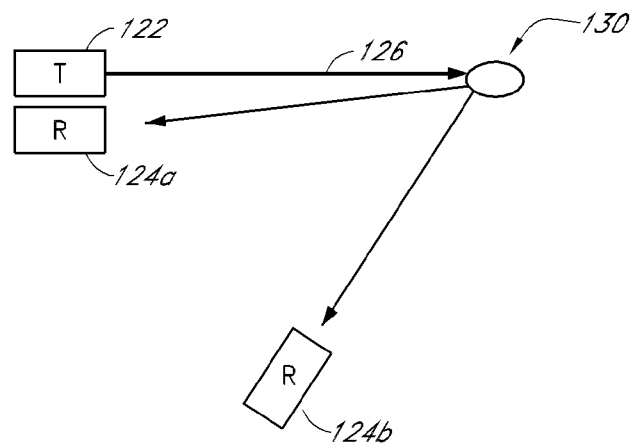
FIG. 3C shows one embodiment of an example bistatic and/or monostatic backscatter detector assembly that can be configured to provide pest detection function of the sensor of the system of FIG. 1.

The transmitter 122 and receiver 124 can also be arranged to detect backscatter of the beam 126 as monostatic and/or bistatic scattering of the beam 126. FIG. 3C shows one embodiment of an example detector assembly wherein a detector 124a is positioned to receive monostatic scattering of the beam 126 from the pest 130, and a detector 124b is positioned to receive bistatic scattering of the beam 126 from the pest 130.

In a backscatter arrangement, the transmitter 122 and receiver 124 can be placed in relative proximity to one another such that reflections of the beam by an insect or other pest are detected by the receiver 124. In on embodiment, the system 100 establishes a background threshold backscatter level corresponding to reflection sources in the room. When a pest walks or flies through the beam, the backscatter level will typically change and the thus the system 100 can record the presence of a pest. The backscatter system has an advantage in that backscatter tends to be occur over relatively large angular regions. Thus, alignment of the transmitter 122 and receiver 124 so that the beam 126 travels from the transmitter 122 to the receiver 124 is relatively easier than in the case of a beam-interrupt system. In a beam interrupt system, the transmitter 122 and receiver 124 typically must be aligned so that the beam emitted by the transmitter 122 is received by the receiver 124.

The sensor assembly 120 can also be configured to provide different heights of the beam 126 relative to the example surface 128. Different heights of one or more beams can be used to allow the pest detection system to distinguish different sized creatures that can be present in the monitored area. An example of such discrimination of different sized creatures is shown in FIG. 4.

Figure 4:
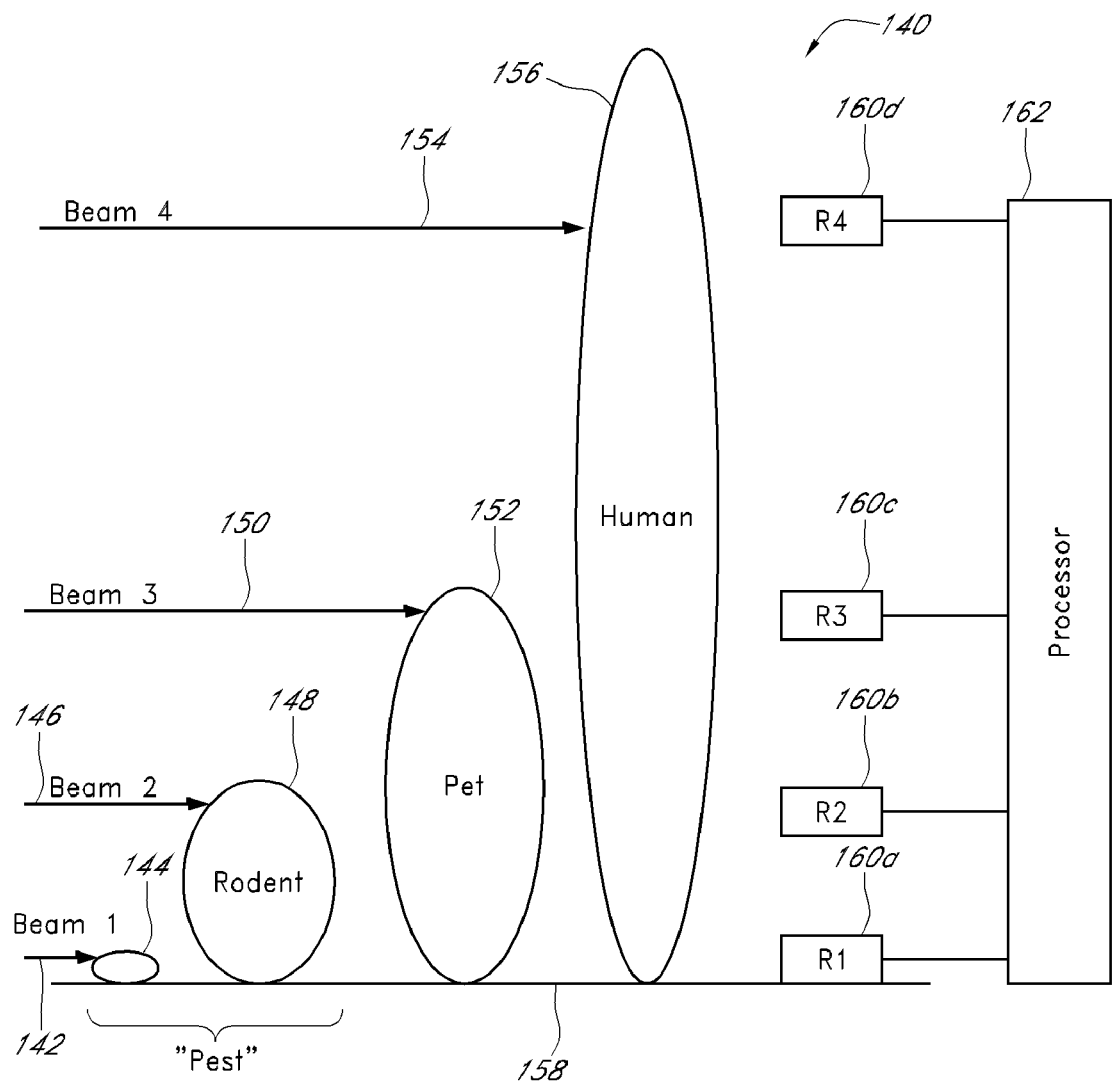
FIG. 4 shows one example embodiment of the detector assembly having a plurality of detectors that can be positioned at different heights and be configured to distinguish different types of detected creatures.

In one embodiment of an example detection system 140 as shown in FIG. 4, a plurality of sensor assemblies are positioned at different selected heights. For example, a first beam 142 is at a first height relative to an example floor surface 158; a second beam 146 is at a second height that is greater than the first height; a third beam 150 is at a third height that is greater than the second height; and a fourth beam 154 is at a fourth height that is greater than the third height. Four example corresponding receivers, 160a, 160b, 160c, and 160d are positioned relative to the surface 158 so as to detect their respective uninterrupted beams 142, 146, 150, and 154, and not detect their respective broken beams (or other uninterrupted beams).

The four example receivers 160 are functionally linked to a processor 162 that can determine what type of creature is likely causing one or more of the beams to be broken. Four example creatures are depicted for the purpose of description—a bug 144, a rodent 148, a pet 152, and a human 156. For the purpose of description, it will be assumed that the foregoing example creatures have increasing heights as listed. For example, the pet 152 is taller than the rodent 148.

As shown in FIG. 4, one or more beams can be positioned at different heights so that the example human 156 is able to break all four beams 142, 146, 150, and 154. The example pet 152 is able to break the three lower beams 142, 146, and 150, but not the highest beam 154. The example rodent 148 is able to break the two lower beams 142 and 146, but not the two highest beams 152 and 156. The example bug 144 is able to break the lowest beam 144, but not the three higher beams 146, 150, and 154. Based on such configuration of the example beam heights, one can see that the processor 162 can be configured to distinguish the foregoing four example creatures. Thus, it will be understood that the pest detection system of the present teachings can be configured to distinguish and/or identify different types of creatures based at least on their sizes, thereby improving the manner in which pests (bugs and rodents in this example) can be detected.

Figure 5:
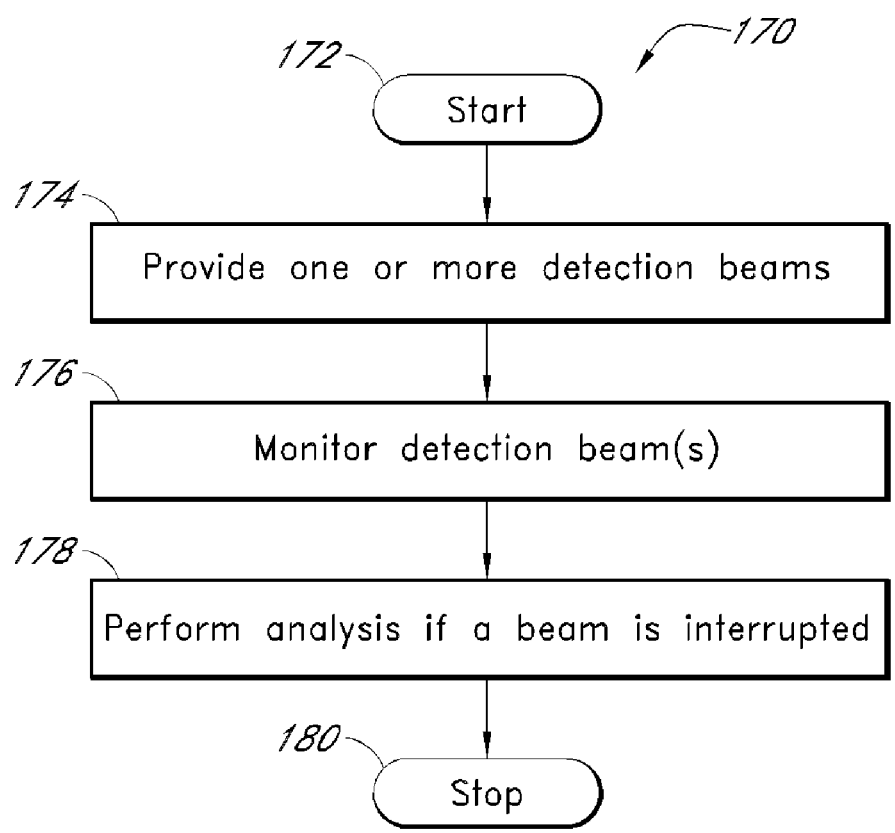
FIG. 5 shows one embodiment of an example process that can be performed in conjunction with the example detector assembly of FIG. 4.

FIG. 5 now shows one embodiment of a process 170 that can achieve the foregoing function of detecting and distinguishing pests from other types of creatures. The process begins at a start state 172, and in a process block 174, the process 170 provides one or more detection beams. In one embodiment, the one or more detection beams are positioned at different heights relative to a given surface such as a floor. In a process block 176, the process 170 monitors the one or more detection beams. In a process block 178, the process 170 performs an analysis if one or more of the detection beams are interrupted.

Figure 6:
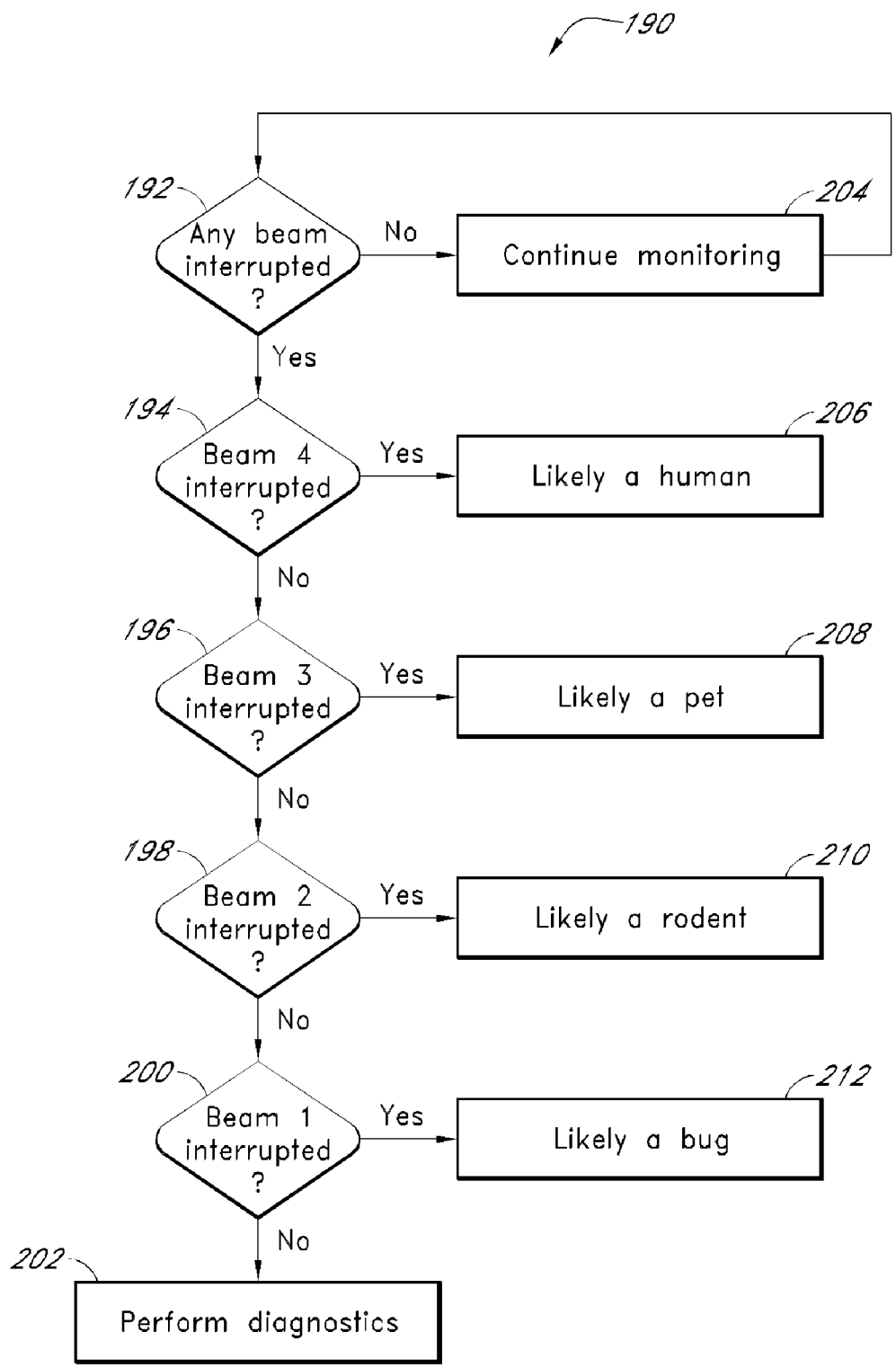
FIG. 6 shows an example process that can perform a portion of the process of FIG. 5 so as to allow differentiation of the example detected creatures.

FIG. 6 shows one embodiment of a process 190 that can be an example of a portion of the process 170 described above in reference to FIG. 5. In particular, the process 190 is described in the context of the example detection system 140 described above in reference to FIG. 4, and can be performed during some combination of the process blocks 176 and 178 of the process 170 of FIG. 5. It will be understood that the process 190 and the detection system 140 are examples for the purpose of description, and in no way are intended to limit the scope of the present teachings.

As shown in FIG. 6, the process 190 in a decision block 192 determines whether any beam has been interrupted. If the answer is "No," then the process 190 in a process block 204 continues the beam monitoring function. In one embodiment, the process 190 loops back to the decision block 192 after a predetermined time. If the answer in the decision block 192 is "Yes," the process 190 proceeds to determine which of the beam(s) has(have) been interrupted.

In a decision block 194, the process 190 determines whether the fourth beam has been interrupted. If the answer is "Yes," then the process 190 in a process block 206 determines that the detected creature is likely a human. If the answer is "No," then the process 190 determines that the detected creature is likely not a human, and continues to a decision block 196.

In the decision block 196, the process 190 determines whether the third beam has been interrupted. If the answer is "Yes," then the process 190 in a process block 208 determines that the detected creature is likely a pet. If the answer is "No," then the process 190 determines that the detected creature is likely not a human or a pet, and continues to a decision block 198.

In the decision block 198, the process 190 determines whether the second beam has been interrupted. If the answer is "Yes," then the process 190 in a process block 210 determines that the detected creature is likely a rodent such as a rat or a mouse. If the answer is "No," then the process 190 determines that the detected creature is likely not a human, pet, or rodent, and continues to a decision block 200.

In the decision block 200, the process 190 determines whether the first beam has been interrupted. If the answer is "Yes," then the process 190 in a process block 212 determines that the detected creature is likely a bug. If the answer is "No," then the process 190 determines that the detected creature is likely not any of the creatures that it is programmed to identify, and proceeds to a process block 202 where a diagnostic function can be performed.

It will be understood that the example process 190 described above in reference to FIG. 6 is an example of how the four example beams can be used to distinguish various sized creatures. It will be understood that within such an example, there are numerous ways of implementing the distinguishing logic, and the example logic of the process 190 is just one example.

Figure 7:
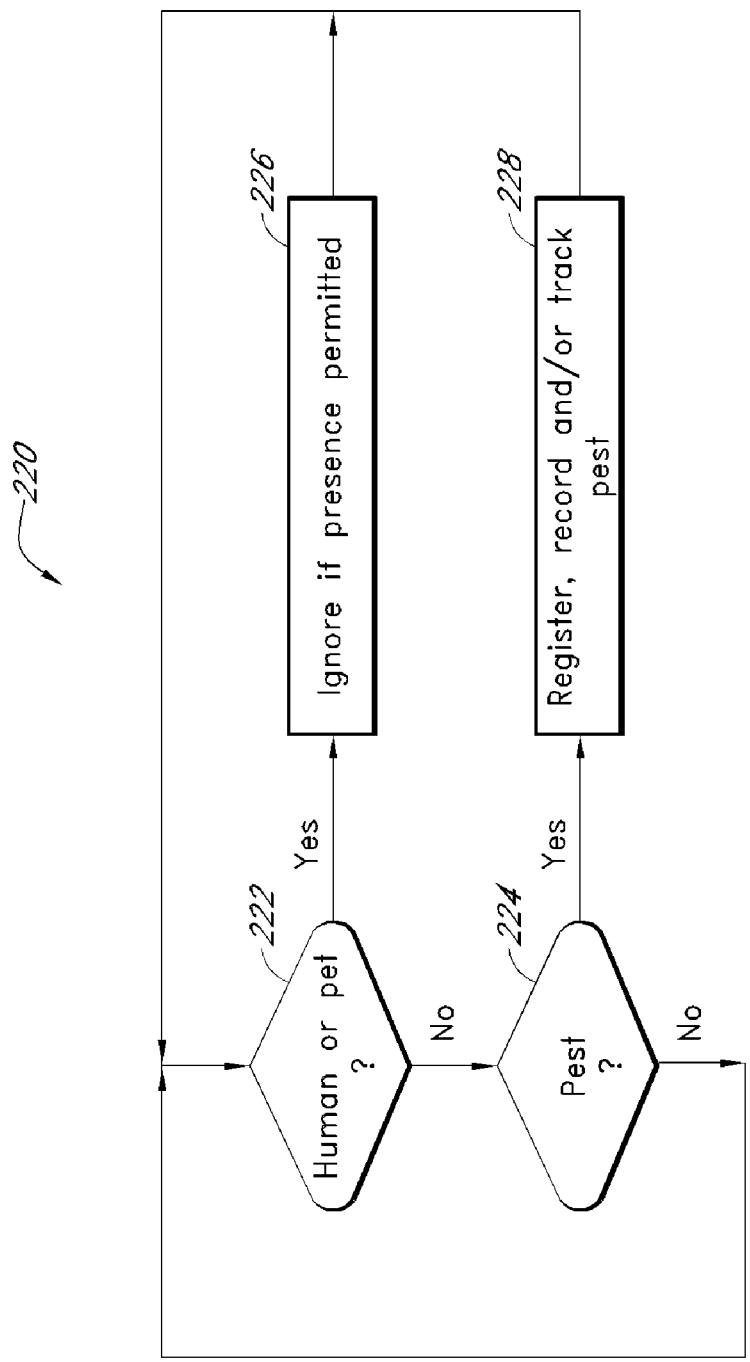
FIG. 7 shows an example process that can perform a portion of the process of FIG. 5 so as to determine what actions can be taken with respect to the detected and differentiated creatures.

FIG. 7 now shows another example process 220 that can process the identified creature information obtained from the example process 190 of FIG. 6. In one embodiment, the process 220 can be configured to ignore the presence of non-pests under certain condition(s), and perform additional function(s) for pests. Thus, as shown in FIG. 7, the example process 220 in a decision block 222 determines whether the detected creature is a human or a pet. If the answer is "Yes," then the process in a process block 226 ignores the human or the pet if it determines that the detected creature's presence is permitted. If the answer is "No," the process 220 proceeds to a decision block 224, where it determines whether the detected creature is a pest (in this example, rodent and/or bug). If the answer is "Yes," the process 220 in a process block 228 performs some combination of functions that registers, records, and tracks the pests. Some examples of these functions are described below in greater detail. In one embodiment, as shown in FIG. 7, the example process 220 can perform a substantially repeating function for analyzing subsequent detections, so that it loops back to the decision block 222 from the process blocks 226 and 228, and also from the "No" result of the decision block 224.

Figure 8:
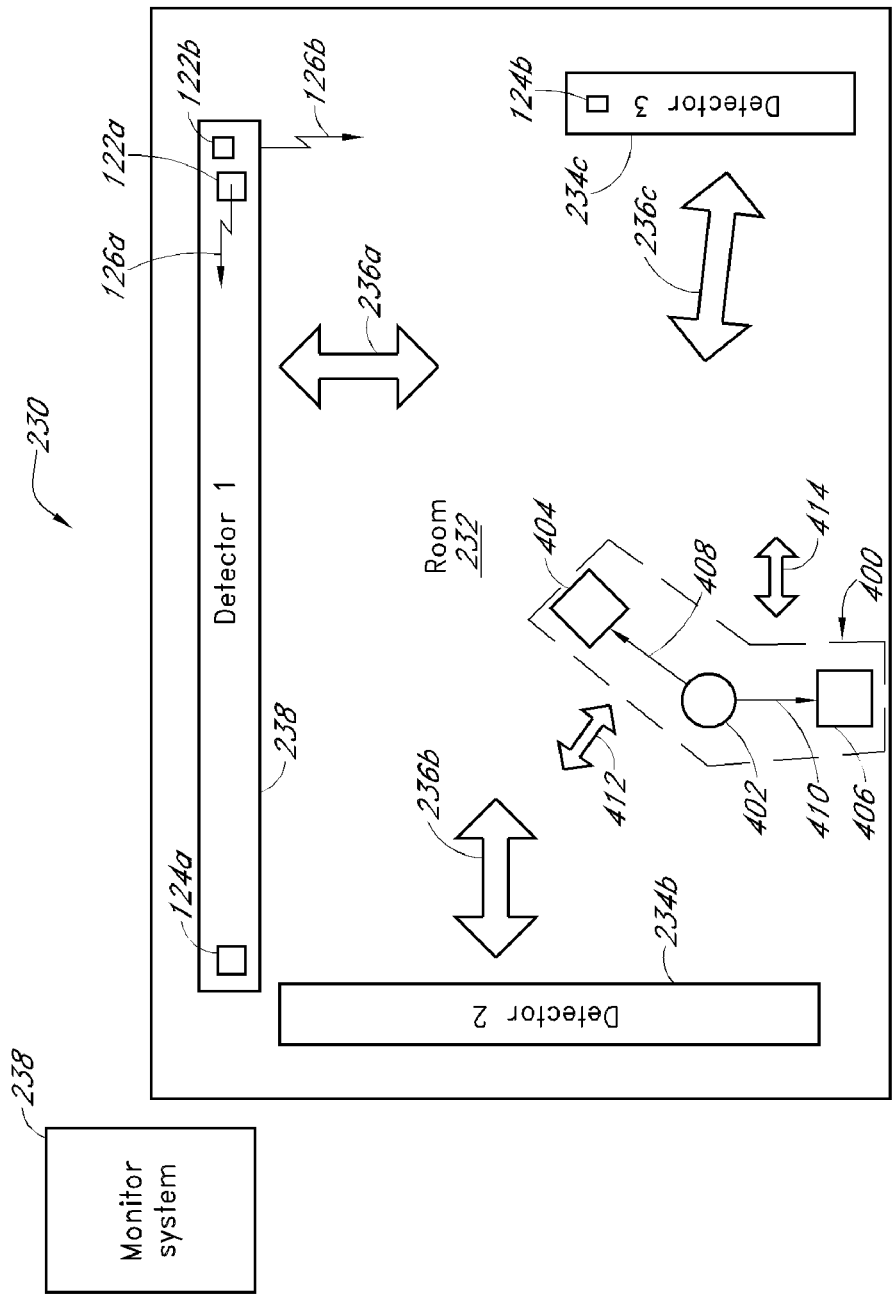
FIG. 8 shows one embodiment of an example detector arrangement in a monitored area, showing that one or more detectors can be arranged in numerous orientations to detect pest movements at different parts of the monitored area.

FIG. 8 now shows by example how the beam-interrupt based detection system described above can be arranged within a given area to register and roughly track the movements of pests. One embodiment of a detection system 230 can include a plurality of detectors positioned at different location within a given area such a room 232. For example, an example first detector 234*a* (having a transmitter and a receiver) is shown to provide a relatively wide coverage along a long wall so as to permit detection of pest movements to and from the long wall, as indicated by an arrow 236*a*. A similar example second detector 234*b* can provide coverage for one of the other walls, so as to permit detection of pest movements to and from that wall, as indicated by an arrow 236*b*. A third example detector 234*c* is shown to be positioned about a corner of the example room 232; such a detector can be used to detect pest movements to and from a location about that corner, as indicated by an arrow 236*c*.

As further shown in FIG. 8, an example detector 400 can also include a transmitter assembly 402 that transmits one or more beams (for example, first and second beams 408 and 410) to different directions. The first beam 408 is shown to be detectable by a first receiver 404 so as to provide information about pest movements along the area between the transmitter assembly 402 and the first receiver (as indicated by an arrow 412). The second beam 410 is shown to be detectable by a second receiver 406 so as to provide information about pest movements along the area between the transmitter assembly 402 and the second receiver 406. The transmitter assembly 402 and the corresponding receivers 404, 406 can be configured in numerous ways to allow flexibility in how and where pest movements can be detected.

In one embodiment, the detection beams, such as those from the transmitter assembly 402, and the corresponding receivers can be passive devices. In one embodiment, the transmitters can provide beams on a substantially continuous basis. In one embodiment, the transmitters can provide beams on an intermittent basis. Transmitters can be scanned or moved to different locations in a flexible manner. In such an embodiment, information about detection can be obtained from the corresponding receivers.

In one embodiment as shown in FIG. 8, detection information from the detectors (and in one embodiment, from the receivers alone) can be transferred to a processing component such as a monitoring system 238. In one embodiment, the monitoring system 238 can be configured to count the number of times a given detection beam is interrupted. Accumulation of such counts for a given period can indicate an estimate of the amount of pest movements for the covered area corresponding to that detection beam.

In one embodiment, the monitoring system 238 includes a light sensor and is configured to operate the pest detection system when the room is dark. In one embodiment, the monitoring system 238 is configured to operate the pest detection system according to a specified time of day (e.g., during the nighttime hours, during the early morning hours, etc.). Many pests are primarily active during the time following darkness and during the early morning hours. In one embodiment, the monitoring system 238 is configured to conserve power by operating the pest detection system for a specified period of time after the lights go out and a specified period of time in the early morning hours when the pests are expected to be active again. Operating in such a manner (e.g., at for a period after dark and a period in early morning) conserves power. In one embodiment, the transmitter 122 and receiver 124 are powered by batteries and such power conservation extends the life of the batteries. In one embodiment, the transmitter 122 operates in a pulse mode wherein the beam 126 is pulsed on and of. Operating in a pulse mode conserves power. Operating in a pulse mode also can be used to increase the signal-to-noise ratio in the pest detection system because the receiver 124 and monitoring system 238 can recognize the pulsed beam 126 in the presence of noise (e.g., radiation from other sources).

In one embodiment, the transmitter 122 and/or the receiver 124 communicate with the monitoring system 238 by using wireless communication (e.g., infrared, radio frequency communication, etc.). In one embodiment, the transmitter 122 and/or the receiver 124 communicate with the monitoring system 238 by using unidirectional wireless communication (e.g., the transmitter receives commands from the monitoring system 238 and the receiver 124 sends received data to the monitoring system 238. In one embodiment, the transmitter 122 and/or the receiver 124 communicate with the monitoring system 238 by using bidirectional wireless communication so that the monitoring system 238 can both send commands and receive data from the transmitter 122 and the receiver 124. In one embodiment, the receiver 124 conserves power by sending data to the monitoring system 238 when queried by the monitoring system 238 or when the receiver 124 detects an interruption (e.g., a full or partial interruption) of the beam. In one embodiment, the receiver 124 collects data (e.g. counts beam interruptions) for a specified period of time and sends the beam interruption data to the monitoring system 238 at periodic intervals. In one embodiment, the receiver 124 collects data (e.g. counts beam interruptions) for a specified period of time and sends the beam interruption data to the monitoring system 238 when the interruption count exceeds a specified value and/or a specified time interval has elapsed.

In one embodiment, the foregoing beam-interrupt based detection system includes transmitter(s) and receiver(s) that are configured for beams including, but not limited to, lasers and other collimated non-laser lights. For lasers, numerous different types can be used, including by way of examples, infrared laser, helium-neon (HeNe) laser, solid state laser, laser diode, and the like.

In one embodiment, the transmitters and/or receivers are battery-powered. In one embodiment, the transmitters and/ore receivers communicate with the processor 104 by wireless communication.

In one embodiment, the energy beam 126 is potentially hazardous to humans or the system is likely to produce false detections when humans or pets interact with the energy beam 126. Thus, in one embodiment, the pest detection system is configured to turn the energy beam 126 off when humans or pets are likely to be in the area where the pest detection system is operating. In one embodiment, the system is configured to produce the energy beam at night. In one embodiment, the pest detection system includes a light sensor, and the system is configured to produce the energy beam during periods of relative darkness. In one embodiment, the system is configured to produce the energy beam during one or more specified time periods. In one embodiment, the pest detection system includes a motion detector configured to detect motion from humans, and wherein the system is configured to produce the energy beam during periods when motion is not detected. In one embodiment, the system is configured to turn off the energy beam when a room light turns on. In one embodiment, the system is configured to turn off the energy beam when motion is detected by a motion detector. In one embodiment, the receiver is configured to send data at regular intervals. In one embodiment, the receiver is configured to send data when a specified pest detection count is exceeded. In one embodiment, the receiver is configured to send data when at least a partial interruption of the beam is detected.

In one embodiment, the receiver is configured to send data when a backscatter from the beam changes. In one embodiment, the receiver is configured to send data when interrogated by the processor.

Figure 9:
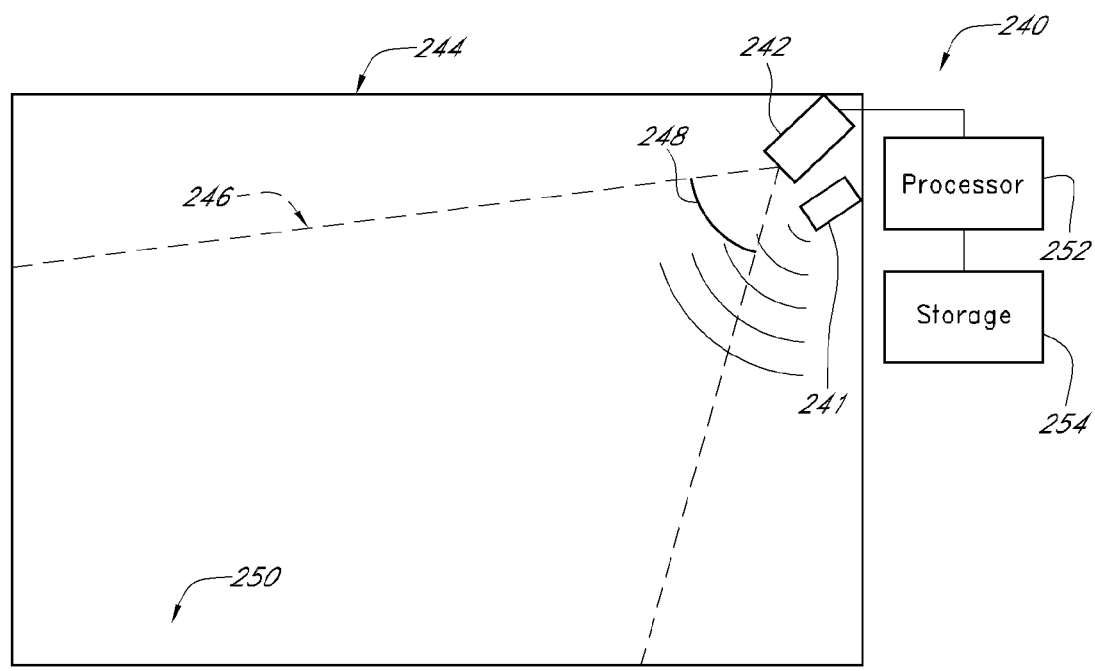
FIG. 9 shows one embodiment of a pest detector system that is based on imaging of a monitored area.

FIGS. 9-14 show various embodiments of an imaging-based pest detection system. The imaging-based pest detection system can be used alone or in combination with other detections systems, such as, fore example, the beam-based system described in connection with FIGS. 1-8 and 19. In one embodiment as shown in FIG. 9, an image-based detection system 240 includes an imaging device 242 such as a camera that is positioned about a monitored area such as a room 244. The camera 242 is shown to have an angular coverage 248 that provides a field of view 246 that defines a monitored area 250. The camera 242 is functionally linked to a processor 252 that processes images obtained from the camera 242. The detection system 240 can further include a storage component 254 that can store data corresponding to raw and/or processed images.

Figure 10:
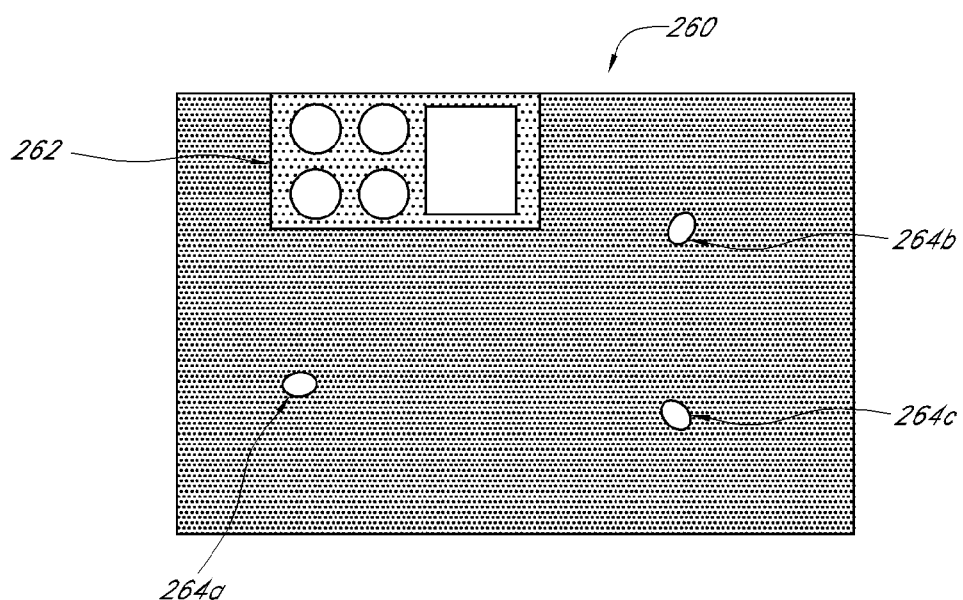
FIG. 10 shows an example image, such as a thermal image, of the monitored area, showing that objects having thermal contrast can be identified.

In one embodiment, the imaging device 242 includes a thermal imaging device that forms an image based on the thermal emissions of objects in the field of view. Such a device can be used in dark environments where pests are more likely to be active. FIG. 10 shows an example thermal image 260 of an example monitored area such as a kitchen. For the purpose of description of FIG. 10, lighter-toned areas are assumed to "warmer" than the darker-toned areas. Thus, the example thermal image 260 is shown to be include example kitchen-related objects such as a stove 262. Such an object can remain warm for extended duration even after being turned off. Thus, the example stove is shown as a warm object. In one embodiment, an optional light source 241, such as an infrared or ultraviolet source is provided to illuminate at least a portion of the field of view 246. In one embodiment, the optional light source 241, is configured to emit a frequency band of light that is not disturbing to the pests but that will provide illumination of the pests for the camera 242. One of ordinary skill in the art will recognize that even though the imaging system of FIGS. 9-14 is described in terms optical systems, the imaging system can be configured to use other forms of radiation, such as for example, microwave radiation, millimeter wave radiation, acoustic wave radiation, etc. Some pest reflect radiation in a non-linear manner and thus emit radiation and a different frequency than they are illuminated with (for example, some insects fluoresce under ultraviolet light), thus, in one embodiment, the camera 242 is configured to image at a different frequency than the radiation provided by the source 241.

The example image 260 is shown to further include one or more objects 264 corresponding to pests. As described below in greater detail, thermal objects 264 such as the pests can be distinguished from stationary and/or known objects.

Figure 11:
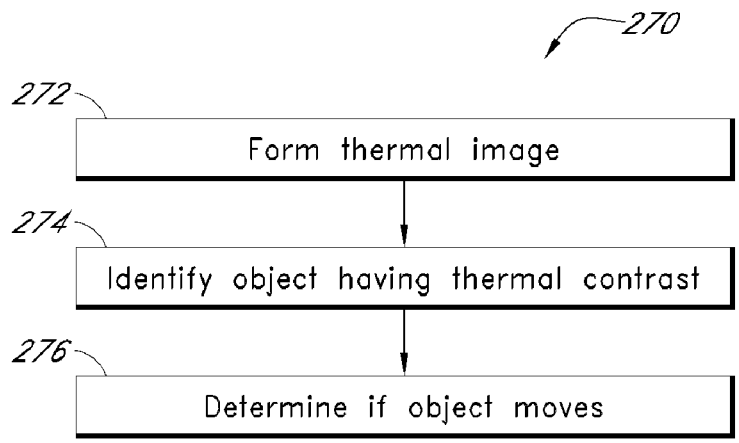
FIG. 11 shows one embodiment of a process that can be configured to identify and detect movement of pests based on one or more thermal images.

FIG. 11 shows one embodiment of a process 270 that can distinguish and identify moving pests in a monitored dark area. The process 270 in a process block 272 forms one or more images of the monitored dark area. In a process block 274, the process 270 identifies one or more objects relatively contrast with the background of the obtained image(s). In a process block 276, the process 270 determines whether one or more of the identified objects move or not. In one embodiment, the moving objects can be identified as pests.

Figure 12:
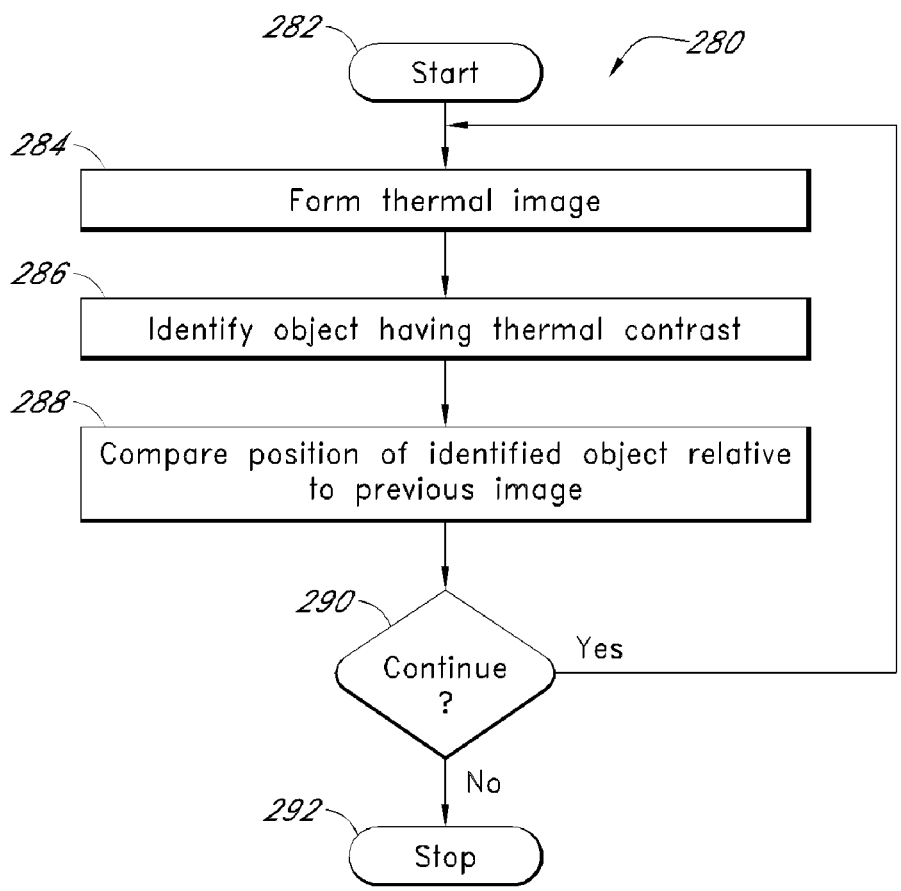
FIG. 12 shows an example process that can perform the pest movement detection of the process of FIG. 11.

FIG. 12 shows one embodiment of a process 280 that can be an example of the process 270 described above in reference to FIG. 11. The example process 280 begins at a start state 282. The process 280 in a process block 284 forms an image (e.g., a thermal image, an IR image, a UV image, etc.) of a monitored area. In a process block 286, the process 280 identifies one or more objects having contrast (e.g., thermal contrast, IR contrast, UV contrast, etc.). In a process block 288, the process 288 compares positions of the one or more identified objects relative to those corresponding to a previous image. In one embodiment, displacements of the identified objects relative to the previous image can be interpreted as resulting from movements of the objects; thus, such objects can be identified as pests. The process 280 in a decision block 290 determines whether monitoring should continue. If the answer is "Yes," the process 280 loops back to the process block 284 to form another thermal image. If the answer is "No," the process 280 ends at a stop state 292.

Figure 13A:
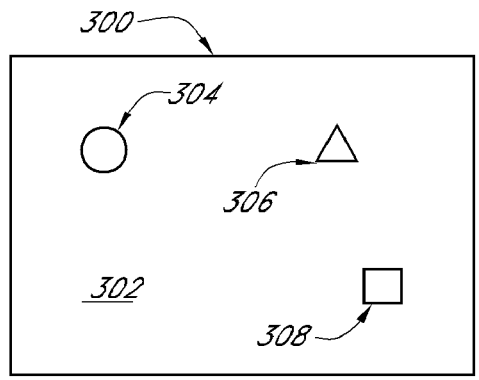
FIGS. 13A-13D show by example how moving pests can be tracked based on comparison of thermal images obtained at different times.

FIGS. 13A-13D now show by example how movements of identified objects can be determined. Such determination of moving objects based on example images can be performed by the example process 280 described above in reference to FIG. 12. FIG. 13A shows a first example image 300 having identified objects 304, 306, and 308 that are contrasted with respect to the background of a monitored area 302.

Figure 13B:
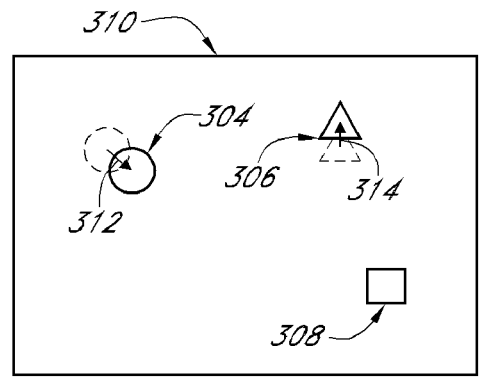

FIG. 13B shows a second example thermal image 310 having the identified objects 304, 306, and 308. In one embodiment, the second image 310 is obtained after a predetermined period from the first image 300. The positions of the objects identified in the second image are depicted in comparison to those corresponding to the first image (objects of the previous image depicted with dotted outlines). As shown in the example second image 310, movements since the previous image are depicted as arrows 312 and 314 for the objects 304 and 306, respectively. The example object 308 is shown to have not moved since the first image 300.

Figure 13C:
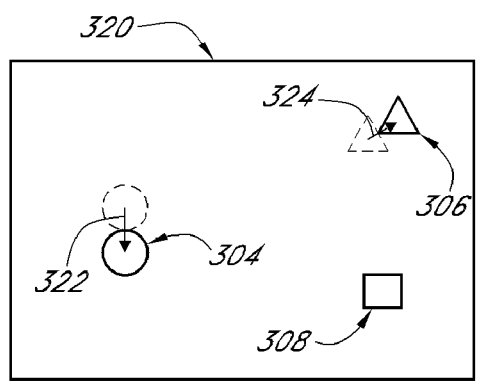
Figure 13D:
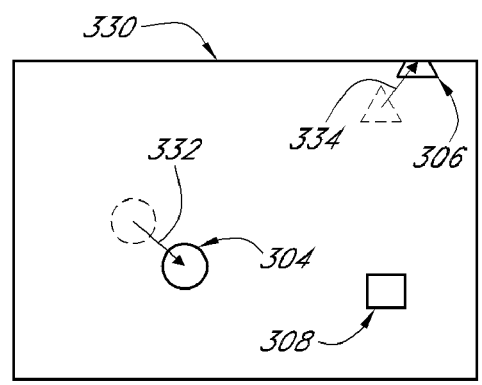

FIGS. 13C and 13D show third and fourth example images 320 and 330. In one embodiment, such images are obtained after the predetermined periods similar to that between the first and second images. The third and fourth images further show movements of the two example objects 304 and 306 as arrows 322, 332 (for the object 304) and arrows 324, 334 (for the object 306). The example object 308 is shown to have not moved in the example third and fourth images 320 and 330.

Figure 14:
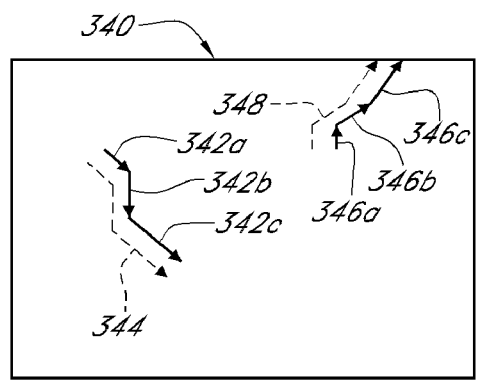
FIG. 14 shows by example how the example movements of FIGS. 13A-13D can be presented in a summarized manner.

In one embodiment, information corresponding to movements of the identified thermal objects (in the example of FIGS. 13A-13D, the arrows 312, 322, 332 for the object 304, and the arrows 314, 324, 334 for the object 306) can be represented in a summarized manner as shown in an example representation 340 in FIG. 14. In the example representation 340, image-by-image movement of the example object 304 is depicted as displacement segments 342a, 342b, and 342c. Similarly, image-by-image movement of the example object 306 is depicted as displacement segments 346a, 346b, and 346c. In one embodiment, a series of joined displacement segments can be manipulated by a number of ways (spline technique, for example) to yield a smoothed representation of the segments. Thus, the series of displacement segments 342 can be manipulated to form a smoothed representation 344. Similarly, the series of displacement segments 346 can be manipulated to form a smoothed representation 348.

Based on the foregoing description in reference to FIGS. 9-14, one can see that various embodiments of the imaging-based detection system allows detection of pests based on their movements in environments that are comfortable for them. As is known, pests generally prefer to operate in darkness when a human being either is not present and/or cannot see them. Thus, identifying moving objects in darkness, such as via thermal imaging, UV imaging, IR imaging, and the like, allows identification of pests based on their sizes and/or their image signatures. By detecting a parameter (motion in one embodiment) that is indicative of a pest, a monitoring system can selectively monitor a given area. For example, a monitoring system can begin recording thermal images after a motion of a qualifying thermal object is detected. Such recording can then pause or stop when no more motion is detected. One can see that such selective recording can improve the efficiency in the recording of the monitored information, as well as reviewing of such information.

Figure 15:
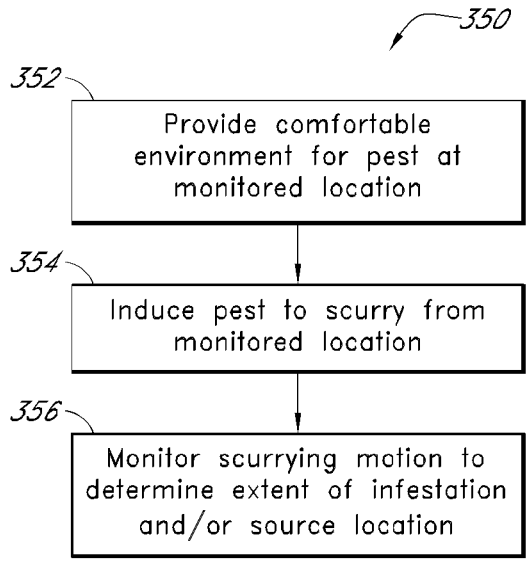
FIG. 15 shows one embodiment of a process that can be configured to monitor pest movement that has been induced.
Figure 16:
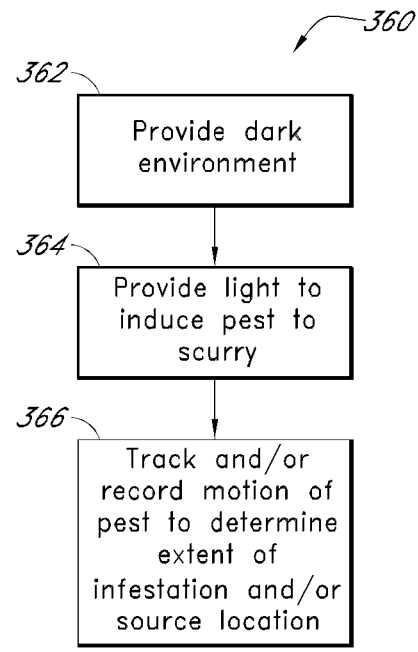
FIG. 16 shows an example process that can perform the induced movement monitoring process of FIG. 15.

FIGS. 15-17 now show that the advantageous features provided by selective monitoring and/or recording are not necessarily limited to thermal imaging of a dark area. As mentioned above, pests usually prefer to move about in an environment that is comfortable for them. In many situations, darkness provides such a comfort level. When light is suddenly introduced to a pest-infested room (for example, by turning on an existing light), pests typically scurry back into their hiding locations. In one embodiment, the pest monitoring system of the present teachings relates to inducing such a scurrying movement and recording the movement. One can see that recording of such scurrying movement can provide information as to the extent of infestation and some indication of where they come from and/or hide.

FIG. 15 shows one embodiment of a process 350 that induces movement of pests and selectively monitors such a movement. The process 350 in a process block 352 provides a comfortable environment for the pests at a monitored area. In a process block 354, the process 350 induces movement of the pests from the monitored area. In one embodiment, such induced movement includes the pests scurrying away from the monitored area. In a process block 356, the process 350 monitors the pest movements to determine extent of infestation and/or source location(s).

FIG. 16 shows one embodiment of a process 360 that can be an example of the process 350 described above in reference to FIG. 15. The process 360 in a process block 362 provides a dark environment for a given area. In one embodiment, such darkness can be provided for a predetermined duration so as to provide a comfortable environment for pests. In one embodiment, such darkness can be provided without a predetermined duration; and subsequent monitoring functions can be triggered by other methods, such as the thermal imaging technique described above. The process 360 in a process block 364 provides light to the given area to induce scurrying motion of the pests. In a process block 368, the process 360 tracks and/or records the motion of the pests to determine the extent of infestation and/or source location(s).

Figure 17A:
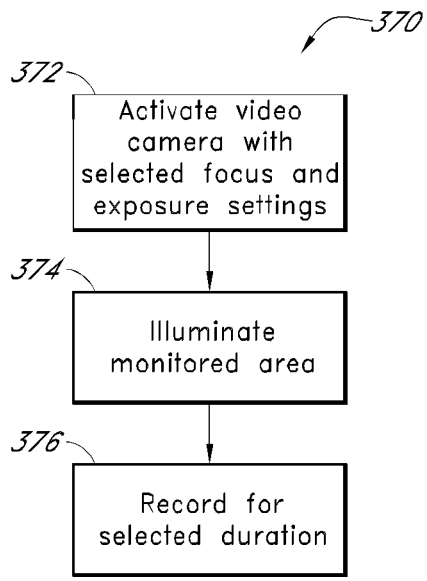
FIGS. 17A and 17B show more specific example processes that can perform the example process of FIG. 16.
Figure 17B:
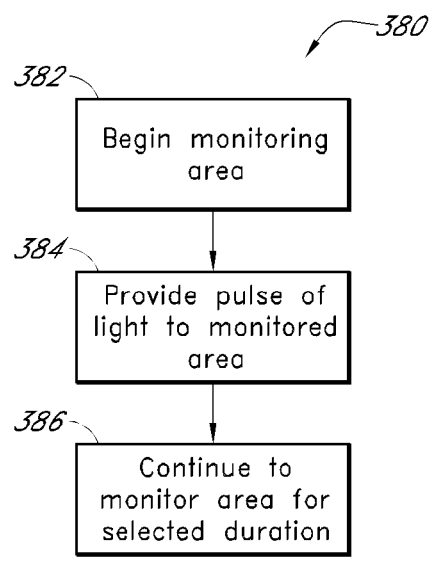

FIGS. 17A and 17B show two example processes that can achieve the process 360 described above in reference to FIG. 16. As shown in FIG. 17A, an example process 370 in a process block 372 activates and prepares a digital video camera or digital still camera 242. In one embodiment, the camera 242 is configured with a selected pre-focus and a predetermined exposure setting to allow proper recording of images substantially immediately after sudden introduction of light when the pests are likely to move quickly. In one embodiment the processor 370 is configured to control one ore more of a focus setting, an exposure setting, a zoom setting, and/or a pan setting. In one embodiment, the processor 370 can control zoom and pan of the camera 242 to change to field of view 250. The process 370 in a process block 374 illuminates the monitored area. In a process block 376, the process 370 records the images of the monitored area for a selected duration.

The example process 370 shows that selectively recording the monitored area during the period of likely pest movement can improve the efficiency in which possible pest detection and source location can be ascertained. Recording after introduction of light can visually indicate presence of pests, if any. Movements of such pests to their hiding locations can also be recorded and reviewed visually.

As shown in FIG. 17B, an example process 380 in a process block 382 begins monitoring of an area. In a process block 384, the process 380 provides a motion-inducing stimulus such as a light pulse to the monitored area. The process 380 in a process block 386 continues to monitor area for a selected duration.

The example process 380 shows that a stimulus does not necessarily need to induce a relatively drastic reaction of the pests, such as their scurrying motion. In some applications, it can be more desirable to monitor and track pest movements at a more "relaxed" environment. Thus, the example pulse of stimulus in the example process 380 can provide induce such movement of the pests in a manner that is somewhere between substantially passive monitoring and the "drastic" response.

Figure 18:
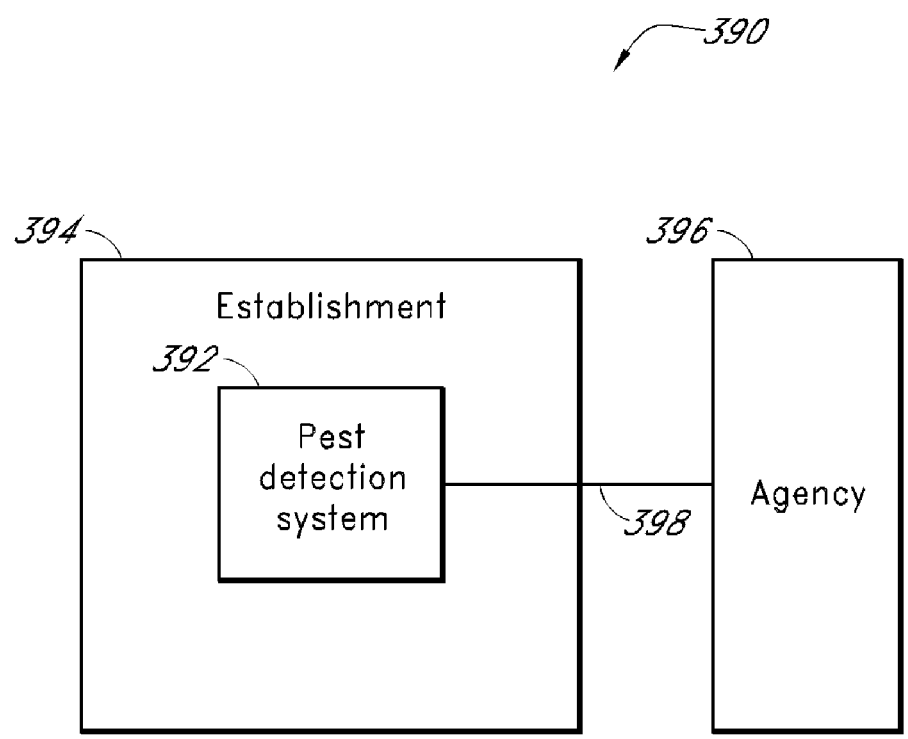
FIG. 18 shows one embodiment of a pest monitoring system that is communicationally linked to an external agency so as to allow external monitoring of an establishment.

One or some combination of the various embodiments of the pest detection system described above can be linked to an agency such as a public health agency. FIG. 18 shows a block diagram of one embodiment of a remote monitoring system 390, where an establishment 394 is monitored by a pest detection system 392. The pest detection system 392 can include any or some combination of the various techniques described above.

In one embodiment as shown in FIG. 18, the pest detection system 392 can be linked to a monitoring agency 396 via a link 398. In one embodiment, the link 398 provides a communication link between the pest detection system 392 and the agency 396. Such a link can allow transmission of information obtained by the pest detection system 392 from its monitoring of the establishment. Such information can include, by way of example, actual relevant recordings of the monitored pests whether in a raw form or some summarized form.

In one embodiment, the system is configured to detect pests at night. In one embodiment, the pest detection system includes a light sensor, and the system is configured to detect pests during periods of relative darkness. In one embodiment, the system is configured to detect pests during one or more specified time periods. In one embodiment, the pest detection system includes a motion detector configured to detect motion from humans, and the system is configured to detect pests during periods when motion is not detected by the motion detector. In one embodiment, the system is configured to suspend pest detection when a room light turns on. In one embodiment, the system is configured to suspend pest detection when motion is detected by a motion detector.

Figure 19:
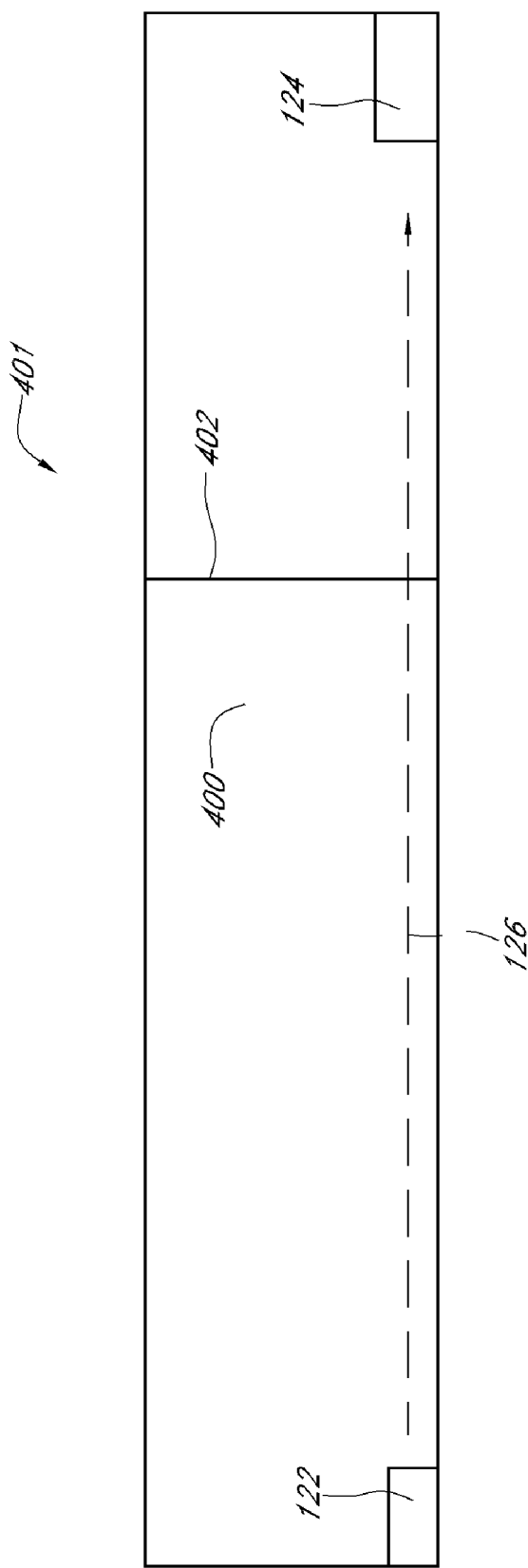
FIG. 19 shows an assembly for mounting the beam transmitter and receiver along a flat surface, such as a baseboard, floor, counter top, and the like, in a manner that aligns the transmitter with the receiver such that the beam from the transmitter is incident on the receiver.

FIG. 19 shows an assembly 401 for mounting the beam transmitter 122 and receiver 124 along a flat surface, such as a baseboard, floor, counter top, and the like, in a manner that aligns the transmitter 122 with the receiver 124 such that the beam 126 from the transmitter 122 is incident on the receiver 124. The transmitter 122 and the receiver 124 are provided to a rigid member 400 such that the optical beam output axis of the transmitter 122 is aligned to be incident on the input of the receiver 124. The rigid member 400 holds the transmitter 122 and receiver 124 in alignment. The assembly 401 can be provided to a flat surface such as, for example, a floor, baseboard, counter top, etc. In one embodiment, the transmitter 122 is provided to the rigid member 400 such that when the rigid member is mounted to a baseboard, the beam 126 is sufficiently close to the floor to allow detection of relatively small pests such as, insects, cockroaches, bugs, spiders, and the like.

In one embodiment, the rigid member 400 includes a joint 402. The rigid member 400 can be separated at the joint 402 and additional rigid member extension sections can be added at the joint 402 to increase the distance between the transmitter 122 and the receiver 124.

Although the above-disclosed embodiments have shown, described, and pointed out the fundamental novel features of the invention as applied to the above-disclosed embodiments, it should be understood that various omissions, substitutions, and changes in the form of the detail of the devices, systems, and/or methods shown can be made by those skilled in the art without departing from the scope of the invention. Consequently, the scope of the invention should not be limited to the foregoing description, but should be defined by the appended claims.

What is claimed is:

1. A system for detecting pests, comprising:
a transmitter configured to produce an energy beam;
a first receiver configured to detect energy from said beam;
a processor provided to said first receiver, said processor configured to detect a presence of pests by determining when said energy beam is at least partially interrupted, said processor further configured to estimate an extent of pest infestation by counting a number of time said beam is at least partially interrupted during a desired time period wherein said system is configured to produce said energy beam during periods when motion is not detected by a motion detector.

2. The system of claim 1, wherein said first receiver is aligned with said beam.

3. The system of claim 1, wherein said first receiver is configured to receive backscattered energy from said beam when said beam illuminates a pest.

4. The system of claim 1, wherein said first receiver is configured to receive bistatic backscattered energy from said beam when said beam illuminates a pest.

5. The system of claim 1, wherein said first receiver is battery-powered.

6. The system of claim 1, wherein said first transmitter is battery-powered.

7. The system of claim 1, wherein said processor is configured to control said first transmitter.

8. The system of claim 1, wherein said processor is configured to control said first transmitter by using wireless communication.

9. The system of claim 1, wherein said processor is configured to receive data from said first receiver by using wireless communication.

10. The system of claim 1, wherein said first receiver is provided at a first height, said system further comprising a second receiver provided at a second height.

11. The system of claim 1, wherein said first transmitter comprises a laser.

12. The system of claim 1, wherein said first transmitter produces said energy beam as a substantially continuous beam.

13. The system of claim 1, wherein said system is configured to produce said energy beam at night.

14. The system of claim 1, further comprising a light sensor, and wherein said system is configured to produce said energy beam during periods of relative darkness.

15. The system of claim 1, wherein said system is configured to produce said energy beam during one or more specified time periods.

16. The system of claim 1, wherein said system is configured to turn off said energy beam when a room light turns on.

17. The system of claim 1, wherein said system is configured to turn off said energy beam when motion is detected by said motion detector.

18. The system of claim 1, wherein said receiver is configured to send data at regular intervals.

19. The system of claim 1, wherein said receiver is configured to send data when a specified pest detection count is exceeded.

20. The system of claim 1, wherein said receiver is configured to send data when at least a partial interruption of said beam is detected.

21. The system of claim 1, wherein said receiver is configured to send data when a backscatter from said beam changes.

22. The system of claim 1, wherein said receiver is configured to send data when interrogated by said processor.

23. The system of claim 1, wherein said camera is configured to produce an image from infrared light corresponding to pests as thermal sources.

* * * * *